United States Patent
Tanimoto et al.

(10) Patent No.: US 11,312,625 B2
(45) Date of Patent: Apr. 26, 2022

(54) HYDROGEN SULFIDE MIXTURE, METHOD FOR PRODUCING SAME, AND FILLING CONTAINER

(71) Applicant: SHOWA DENKO K.K., Tokyo (JP)

(72) Inventors: Yosuke Tanimoto, Tokyo (JP); Yasuyuki Hoshino, Tokyo (JP)

(73) Assignee: SHOWA DENKO K.K, Tokyo (JP)

( * ) Notice: Subject to any disclaimer, the term of this patent is extended or adjusted under 35 U.S.C. 154(b) by 297 days.

(21) Appl. No.: 16/311,404

(22) PCT Filed: May 17, 2017

(86) PCT No.: PCT/JP2017/018513
§ 371 (c)(1),
(2) Date: Dec. 19, 2018

(87) PCT Pub. No.: WO2017/221594
PCT Pub. Date: Dec. 28, 2017

(65) Prior Publication Data
US 2019/0185323 A1    Jun. 20, 2019

(30) Foreign Application Priority Data

Jun. 22, 2016 (JP) ............................. JP2016-123120

(51) Int. Cl.
*C01B 17/16* (2006.01)
*F17C 1/00* (2006.01)
*F17C 1/14* (2006.01)
*F17C 5/06* (2006.01)

(52) U.S. Cl.
CPC ............... *C01B 17/16* (2013.01); *F17C 1/00* (2013.01); *F17C 1/14* (2013.01); *F17C 5/06* (2013.01); *F17C 2203/0643* (2013.01); *F17C 2221/037* (2013.01)

(58) Field of Classification Search
CPC ......... C01B 17/168; C01B 17/16; F17C 1/00; F17C 1/14; F17C 5/06; F17C 2203/0643; F17C 2221/037
USPC ............................ 423/563; 588/249; 206/527
See application file for complete search history.

(56) References Cited

U.S. PATENT DOCUMENTS

| 2,624,694 | A | * | 1/1953 | Sailors | C07C 7/1485 |
| | | | | | 208/224 |
| 2,694,619 | A | * | 11/1954 | Wilkins | C01B 17/161 |
| | | | | | 423/563 |
| 3,437,567 | A | * | 4/1969 | Bogart | C01B 5/02 |
| | | | | | 203/93 |
| 3,518,167 | A | * | 6/1970 | Klett | C01C 1/10 |
| | | | | | 203/78 |
| 3,903,250 | A | * | 9/1975 | Tsutsumishita | C01B 17/167 |
| | | | | | 423/563 |
| 3,966,633 | A | * | 6/1976 | Friedman | C01B 3/22 |
| | | | | | 252/373 |
| 4,220,183 | A | | 9/1980 | Gökcek | |
| 4,784,775 | A | * | 11/1988 | Hardison | C02F 1/683 |
| | | | | | 210/712 |
| 6,960,330 | B1 | * | 11/2005 | Cox, Jr. | A62D 3/38 |
| | | | | | 423/226 |
| 2005/0150779 | A1 | | 7/2005 | Jacksier et al. | |
| 2005/0167636 | A1 | | 8/2005 | Jacksier et al. | |
| 2005/0271544 | A1 | | 12/2005 | Benesch et al. | |
| 2007/0116622 | A1 | | 5/2007 | Jacksier et al. | |
| 2015/0266734 | A1 | * | 9/2015 | Hasenberg | C01B 17/162 |
| | | | | | 423/564 |
| 2015/0315485 | A1 | * | 11/2015 | Morris | C10G 21/30 |
| | | | | | 95/8 |

FOREIGN PATENT DOCUMENTS

| CN | 1646907 A | 7/2005 |
| CN | 1975415 A | 6/2007 |
| JP | 2-141406 A | 5/1990 |
| JP | 9-324897 A | 12/1997 |
| JP | 2013-028392 A | 1/2003 |
| JP | 2004-536227 A | 12/2004 |
| JP | 2005-527822 A | 9/2005 |

OTHER PUBLICATIONS

Communication dated Apr. 24, 2019, from the European Patent Office in counterpart European Application No. 17815064.5.
International Search Report for PCT/JP2017/018513 dated Jul. 18, 2017 [PCT/ISA/210].
International Preliminary Report on Patentability with the translation of Written Opinion dated Jan. 3, 2019 issued by the International Bureau in International Application No. PCT/JP2017/018513.

* cited by examiner

*Primary Examiner* — Patricia L. Hailey
(74) *Attorney, Agent, or Firm* — Sughrue Mion, PLLC

(57) ABSTRACT

To provide a hydrogen sulfide mixture hardly corroding metals. The hydrogen sulfide mixture contains hydrogen sulfide and water. The hydrogen sulfide mixture is filled into a filling container so that at least one part of the hydrogen sulfide mixture is liquid and the moisture concentration of a gaseous phase is 0.001 mol ppm or more and less than 75 mol ppm.

5 Claims, No Drawings

HYDROGEN SULFIDE MIXTURE, METHOD FOR PRODUCING SAME, AND FILLING CONTAINER

CROSS REFERENCE TO RELATED APPLICATIONS

This application is a National Stage of International Application No. PCT/JP2017/018513, filed on May 17, 2017, which claims priority from Japanese Patent Application No. 2016-123120, filed on Jun. 22, 2016.

TECHNICAL FIELD

The present invention relates to a hydrogen sulfide mixture, a method for producing the same, and a filling container.

BACKGROUND ART

Hydrogen sulfide ($H_2S$) has been used for producing a phosphor, a compound semiconductor, and a CIGS (Copper-Indium-Gallium-Selenium) solar cell, and the like but has been examined to be used also for producing a Si semiconductor in recent years. In the production of the Si semiconductor, the hydrogen sulfide has been used for fine processing, and therefore high purity hydrogen sulfide has been required, and thus a demand for an improvement of the quality has increased.

However, hydrogen sulfide gas filled into a filling container has had the following problems. More specifically, the hydrogen sulfide contains a trace amount of moisture difficult to remove in a production process. Even when high purity hydrogen sulfide with a sufficiently low moisture concentration is filled into a filling container, the moisture is concentrated within the filling container in some cases. Therefore, there has been a possibility that hydrogen sulfide gas with an insufficiently low moisture concentration is emitted from the filling container. This problem is described in detail below.

When the hydrogen sulfide gas is emitted from the filling container, liquefied hydrogen sulfide of a liquid phase evaporates to maintain the vapor-liquid equilibrium within the filling container. In that case, moisture having a vapor-liquid equilibrium constant of about 0.2 has a small evaporation amount as compared with that of the hydrogen sulfide, and therefore is likely to remain on the liquid phase side, and then the moisture is concentrated within the filling container with the emission of the hydrogen sulfide gas. Therefore, the amount of the moisture entrained in the hydrogen sulfide gas is very small in the early stage of the start of the emission and the moisture concentration of the hydrogen sulfide gas is sufficiently low. However, with the progress of a reduction in the liquid phase by the evaporation, the amount of the moisture entrained in the hydrogen sulfide gas gradually increases, and thus the moisture concentration of the hydrogen sulfide gas increases.

For example, the moisture concentration of the liquid phase in the completion of the filling into the filling container in the hydrogen sulfide generally referred to as a high purity article is about 300 mol ppm. However, in a state where the moisture is concentrated on the liquid phase side with the emission of the hydrogen sulfide gas from the filling container and the entire amount of the liquefied hydrogen sulfide is finally gasified, the moisture concentration of a gaseous phase increases to about 1500 mol ppm. Although products with lower moisture concentrations are also circulating in the market, the moisture concentration of the liquid phase in the completion of the filling into the filling container is about 20 mol ppm and the moisture concentration of the gaseous phase in the state where the entire amount of the liquefied hydrogen sulfide is finally gasified is about 100 mol ppm.

When the moisture concentration of the hydrogen sulfide gas is high, the moisture is likely to adhere to the inner wall surface of piping through which the hydrogen sulfide gas flows. The hydrogen sulfide is absorbed into the moisture to be hydrosulfuric acid, and therefore there is a possibility that the piping corrodes and deteriorates, and thus the repair cost increases. Moreover, when the degradation of the piping proceeds to cause the leakage of hydrogen sulfide gas harmful to a human body, there is a possibility that a disaster or an accident occurs. Furthermore, the piping is formed of stainless steel in many cases. When heavy metals, such as nickel, chromium, and iron, eluted from the piping due to the corrosion are entrained in the hydrogen sulfide gas, there is a possibility that, when hydrogen sulfide gas is used as an additive of an etching gas of a semiconductor wafer, for example, the heavy metals adhere to the wafer surface to pollute the wafer.

To solve the problems, PTL 1 discloses a removal method by dehumidification agents, such as synthetic zeolite, for example, as a method for removing the moisture in the hydrogen sulfide. However, the moisture concentration required for corrosion control is unknown, and therefore the method described in Patent Document 1 has been difficult to provide hydrogen sulfide capable of controlling corrosion.

CITATION LIST

Patent Literature

PTL 1: JPH2-141406 A1

SUMMARY OF INVENTION

Technical Problem

Then, it is an object of the present invention to solve the problems of conventional technologies described above and provide a hydrogen sulfide mixture hardly corroding metals and a method for producing the same. It is another object of the present invention to provide a filling container filled with the hydrogen sulfide mixture hardly corroding metals.

Solution to Problem

To solve the above-described problems, one aspect of the present invention is as described in [1] to [11] below.

[1] A hydrogen sulfide mixture contains hydrogen sulfide and water, in which the hydrogen sulfide mixture is filled into a filling container so that at least one part of the hydrogen sulfide mixture is liquid and the moisture concentration of a gaseous phase is 0.001 mol ppm or more and less than 75 mol ppm.

[2] A hydrogen sulfide mixture contains hydrogen sulfide and water, in which the hydrogen sulfide mixture is filled into a filling container so that at least one part of the hydrogen sulfide mixture is liquid and the moisture concentration of a liquid phase is 0.01 mol ppm or more and less than 15 mol ppm.

[3] The hydrogen sulfide mixture according to [1] or [2], in which a ratio $V/G_0$ of the internal volume V (unit: L) of the filling container to the initial filling amount $G_0$ (unit: kg) into the filling container is 1.47 or more and 2.10 or less.

[4] A method for producing a hydrogen sulfide mixture containing hydrogen sulfide and water includes a dehydration process of bringing a hydrogen sulfide mixture having a moisture concentration of 15 mol ppm or more into contact with a moisture adsorbent to reduce the moisture concentration to less than 10 mol ppm and a filling process of filling the hydrogen sulfide mixture obtained in the dehydration process into a filling container so that at least one part of the hydrogen sulfide mixture is liquid and the moisture concentration of a liquid phase in the completion of the filling is 0.01 mol ppm or more and less than 15 mol ppm.

[5] The method for producing a hydrogen sulfide mixture according to [4], in which at least one part of the filling container is formed of stainless steel.

[6] The method for producing a hydrogen sulfide mixture according to [4] or [5], in which a ratio $V/G_1$ of the internal volume V (unit: L) of the filling container to the filling amount $G_1$ (unit: kg) of the hydrogen sulfide mixture into the filling container in the filling process is 1.47 or more and 37.0 or less.

[7] A filling container filled with a hydrogen sulfide mixture containing hydrogen sulfide and water, in which the hydrogen sulfide mixture is filled so that at least one part of the hydrogen sulfide mixture is liquid and the moisture concentration of a gaseous phase is 0.001 mol ppm or more and less than 75 mol ppm.

[8] A filling container filled with a hydrogen sulfide mixture containing hydrogen sulfide and water, in which the hydrogen sulfide mixture is filled so that at least one part of the hydrogen sulfide mixture is liquid and the moisture concentration of a liquid phase is 0.01 mol ppm or more and less than 15 mol ppm.

[9] The filling container according to [7] or [8], in which the ratio $V/G_0$ of the internal volume V (unit: L) to the initial filling amount $G_0$ (unit: kg) of the hydrogen sulfide mixture is 1.47 or more and 2.10 or less.

[10] The filling container according to any one of [7] to [9], in which the capacity is 1 L or more and 2000 L or less.

[11] The filling container according to any one of [7] to [10], in which at least one part is formed of stainless steel.

Advantageous Effects of Invention

The present invention can provide a hydrogen sulfide mixture hardly corroding metals.

DESCRIPTION OF EMBODIMENTS

The present invention specifies the moisture concentration in hydrogen sulfide to control the corrosion of metals by the hydrogen sulfide. It is generally known that the corrosion of metals by the hydrogen sulfide is strongly influenced by the moisture concentration but the influence of the moisture concentration of a ppm level has not been clarified.

Then, as a result of extensively examining the corrosion of metals by a trace amount of moisture in the hydrogen sulfide, the present inventors have surprisingly found that the corrosion of metals is remarkably controlled when the moisture concentration is sufficiently low at a ppm level, and thus have accomplished the present invention. Hereinafter, one embodiment of the present invention is described in detail.

A hydrogen sulfide mixture of this embodiment contains hydrogen sulfide and water. The hydrogen sulfide mixture is filled into a filling container so that at least one part of the hydrogen sulfide mixture is liquid and the moisture concentration of a gaseous phase is 0.001 mol ppm or more and less than 75 mol ppm. The moisture concentration of a liquid phase is 0.01 mol ppm or more and less than 15 mol ppm.

A filling container of this embodiment is a filling container filled with the hydrogen sulfide mixture containing hydrogen sulfide and water. The hydrogen sulfide mixture is filled into the filling container so that at least one part of the hydrogen sulfide mixture is liquid and the moisture concentration of the gaseous phase is 0.001 mol ppm or more and less than 75 mol ppm. The moisture concentration of the liquid phase is 0.01 mol ppm or more and less than 15 mol ppm.

The moisture concentrations of the gaseous phase and the liquid phase described above are the moisture concentrations of the gaseous phase and the liquid phase from the point of time when the filling of the hydrogen sulfide mixture into the filling container is completed to the point of time when the substantially entire amount of the hydrogen sulfide mixture in the filling container is discharged.

When the moisture concentration of the gaseous phase of the hydrogen sulfide mixture in which the gaseous phase and the liquid phase coexist is less than 0.01 mol ppm, it is difficult to directly measure the moisture concentration. Therefore, one fifth of the moisture concentration of the liquid phase is regarded as the moisture concentration of the gaseous phase. This is based on the fact that it is experientially known that the moisture concentrations in the hydrogen sulfide in which the gaseous phase and the liquid phase coexist satisfy Moisture concentration of gaseous phase: Moisture concentration of liquid phase=1:5.

In such a hydrogen sulfide mixture, the moisture concentration of the liquid phase in the completion of the filling into the filling container is very low. Therefore, even when the moisture is concentrated on the liquid phase side with the emission of hydrogen sulfide mixture gas from the filling container, a state where the moisture concentration of the liquid phase is sufficiently low is maintained until the entire amount of the liquefied hydrogen sulfide mixture in the filling container is gasified. Accordingly, the moisture concentration of the hydrogen sulfide mixture gas emitted from the filling container is sufficiently low from the early stage of the emission to the end of the emission (time when the entire amount of the liquefied hydrogen sulfide mixture in the filling container is gasified). Therefore, the corrosion of metals by the hydrogen sulfide mixture gas emitted from the filling container can be remarkably controlled to the end of the emission.

The moisture concentration of the liquid phase is 0.01 mol ppm or more and less than 15 mol ppm and is preferably 0.01 mol ppm or more and 14 mol ppm or less, more preferably 0.01 mol ppm or more and 7.0 mol ppm or less, and still more preferably 0.01 mol ppm or more and 0.75 mol ppm or less.

When the moisture concentration of the liquid phase is less than 15 mol ppm, the moisture concentration of the hydrogen sulfide mixture gas emitted from a filling container is maintained at a level (for example, less than 75 mol ppm) where the corrosion of metals is controlled to the end of the emission, even when the moisture is concentrated on the liquid phase side with the emission of the hydrogen sulfide mixture gas from the filling container. The moisture concentration lower than 0.01 mol ppm is difficult to confirm.

The hydrogen sulfide mixture in the filling container and the hydrogen sulfide mixture gas emitted from the filling container have low moisture concentrations and are hard to corrode metals as described above. Therefore, for a portion which the hydrogen sulfide mixture in the filling container and the hydrogen sulfide mixture gas emitted from the filling container contact, metals, such as stainless steel, can be used, without the use of expensive corrosion-resistant alloys, such as HASTELLOY (Trademark). For example, portions in contact with the hydrogen sulfide mixture in a filling container, piping, a production device, a supply device, a conveying device, a reaction device, and the like of the hydrogen sulfide mixture can be formed of metals, such as stainless steel. The type of usable stainless steel is not particularly limited and SUS316, SUS316L, SUS304, SUS304L, and the like are mentioned.

The initial filling amount $G_0$ (unit: kg) of the hydrogen sulfide mixture into the filling container is the filling amount in the completion of a filling process and may also be set to 70% or more and 100% or less of the upper limit of the mass calculated according to the internal volume V of the filling container prescribed by Paragraph 4 of Article 48 of High Pressure Gas Safety Act, although not particularly limited. In other words, the ratio $V/G_0$ of the internal volume V (unit: L) of the filling container to the initial filling amount $G_0$ (unit: kg) of the hydrogen sulfide mixture into the filling container is not particularly limited and may be set to 1.47 or more and 2.10 or less.

When the ratio $V/G_0$ is 1.47 or more (i.e., when the initial filling amount $G_0$ of the hydrogen sulfide mixture into the filling container is 100% or less of the upper limit of the mass calculated according to the internal volume V of the filling container), the filling of the hydrogen sulfide mixture into the filling container is not overfilling, and thus is safe. On the other hand, when the ratio $V/G_0$ is 2.10 or less (i.e., when the initial filling amount $G_0$ of the hydrogen sulfide mixture into the filling container is 70% or more of the upper limit of the mass calculated according to the internal volume V of the filling container), the initial filling amount $G_0$ of the hydrogen sulfide mixture to the internal volume V of the filling container is a sufficient amount, and therefore the transportation efficiency of the hydrogen sulfide mixture by the filling container is high.

The ratio $V/G_0$ of the internal volume V (unit: L) of the filling container to the initial filling amount $G_0$ (unit: kg) of the hydrogen sulfide mixture into the filling container is more preferably 1.50 or more and 2.00 or less and still more preferably 1.53 or more and 1.90 or less.

Next, one embodiment of a method for producing the above-described hydrogen sulfide mixture is described. First, the moisture is removed from hydrogen sulfide mixture gas having a moisture concentration of 15 mol ppm or more in a dehydration process to obtain a hydrogen sulfide mixture gas having a moisture concentration of less than 10 mol ppm. In the dehydration process, the hydrogen sulfide mixture gas having a moisture concentration of 15 mol ppm or more is brought into contact with a moisture adsorbent to be dehydrated to set the moisture concentration to less than 10 mol ppm. The type of the moisture adsorbent is not particularly limited insofar as the moisture concentration of the hydrogen sulfide mixture gas can be set to less than 10 mol ppm. For example, zeolite, activated carbon, silica gel, and diphosphorus pentoxide are mentioned. The type of the zeolite is not particularly limited and a ratio of silica and alumina contained in the zeolite and the pore size of fine pores are also not particularly limited. Those having hydrogen sulfide resistance are preferable and, for example, Molecular Sieve 3A and high silica zeolite are mentioned.

The hydrogen sulfide mixture gas having a moisture concentration set to less than 10 mol ppm by the dehydration process is compressed, and then filled into a filling container having a capacity of 1 L or more and 2000 L or less, for example, in the filling process. In that case, the hydrogen sulfide mixture gas is compressed and filled so that at least one part of the hydrogen sulfide mixture gas is liquid and the moisture concentration of a liquid phase in the completion of the filling is 0.01 mol ppm or more and less than 15 mol ppm.

A method for compressing the hydrogen sulfide mixture gas and filling the compressed hydrogen sulfide mixture gas into a filling container is not limited. For example, a method is mentioned which includes increasing the pressure of the hydrogen sulfide mixture gas with a compressor to liquefy the hydrogen sulfide mixture gas, removing a low boiling point component and a high boiling point component using a distillation column, storing the resultant hydrogen sulfide mixture gas in a product tank, and then moving the resultant hydrogen sulfide mixture gas to a filling container from the product tank to fill the resultant hydrogen sulfide mixture gas into the filling container.

The capacity of the filling container can be set to 1 L or more and 2000 L or less and preferably 2 L or more and 1800 L or less and more preferably 3 L or more and 1500 L or less. When the capacity of the filling container is 1 L or more, the amount of the usable hydrogen sulfide mixture is large, and therefore the efficiency is excellent. On the other hand, when the capacity of the filling container is 2000 L or less, the filling container is easily produced and transported.

The temperature of the filling container is not particularly limited in filling the hydrogen sulfide mixture into the filling container. The filling container may be cooled beforehand to $-90°$ C. or more and $0°$ C. or less. Furthermore, when the moisture remains in the filling container, the moisture concentration of the filled hydrogen sulfide mixture increases. Therefore, heating decompression treatment may be performed beforehand so that the amount of the remaining moisture in the filling container is 0.1 mol ppm or less.

Furthermore, the ratio $V/G_1$ of the internal volume V (unit: L) of the filling container to the filling amount $G_1$ (unit: kg) of the hydrogen sulfide mixture into the filling container in the filling process is not particularly limited and may also be set to 1.47 or more and 37.0 or less. When the ratio $V/G_1$ is 1.47 or more, the filling of the hydrogen sulfide mixture into the filling container is not overfilling, and thus is safe. On the other hand, when the ratio $V/G_1$ is 37.0 or less, the hydrogen sulfide mixture is liquefied.

The ratio $V/G_1$ of the internal volume V (unit: L) of the filling container to the filling amount $G_1$ (unit: kg) of the hydrogen sulfide mixture into the filling container in the filling process is more preferably 1.47 or more and 2.70 or less and still more preferably 1.47 or more and 2.10 or less.

A method for measuring the moisture concentration of the hydrogen sulfide mixture in each process (dehydration process, filling process) of the method for producing the hydrogen sulfide mixture of this embodiment is not particularly limited insofar as the measurement up to about 0.01 mol ppm can be correctly performed. For example, a mirror surface cooling type dew point meter, a Fourier transform infrared spectrometer (FT-IR), a method using a phosphorus pentaoxide type moisture meter or the like, and a cavity ring-down spectroscopy (CRDS) are mentioned.

In the case of a gaseous phase, the moisture concentration in the present invention is one measured by taking out a sample from a gaseous phase portion of the filling container, and then measuring the moisture concentration by the cavity ring-down spectroscopy. On the other hand, in the case of a liquid phase, the moisture concentration in the present invention is one measured by taking out a sample from a liquid phase portion of the filling container, gasifying the same, and then measuring the moisture concentration by the cavity ring-down spectroscopy as in the case of the gaseous phase.

According to such a method for producing the hydrogen sulfide mixture of this embodiment, a hydrogen sulfide mixture having a very low moisture concentration and hardly causing the corrosion of metals, such as stainless steel, can be produced with a simple facility. The hydrogen sulfide mixture produced by the method for producing the hydrogen sulfide mixture of this embodiment is usable as an addition gas or an interface treatment gas in etching in the production of a semiconductor or a thin film transistor.

Furthermore, the hydrogen sulfide mixture obtained by the method for producing the hydrogen sulfide mixture of this embodiment is also usable for the production of various chemicals, such as pharmaceutical agents and dye intermediates.

Although this embodiment describes an example of the present invention, the present invention is not limited to this embodiment. Moreover, this embodiment can be variously altered or modified and embodiments subjected to the alternations or the modifications can also be encompassed in the present invention.

EXAMPLES

Hereinafter, the present invention is described in more detail with reference to Examples and Comparative Examples.

Example 1

Into a filling container having a capacity of 47 L, 30 kg of a hydrogen sulfide mixture containing hydrogen sulfide and water was filled so that one part of the hydrogen sulfide mixture was a liquid. The ratio $V/G_0$ of the internal volume V of the filling container to the initial filling amount $G_0$ at this time is 1.57. The hydrogen sulfide mixture in the filling container was separated into a gaseous phase and a liquid phase. The moisture concentration of the liquid phase in the completion of the filling was 12 mol ppm.

The gaseous phase was extracted from the filling container at a discharge rate of 2 L/min until the remaining amount of the hydrogen sulfide mixture in the filling container was 1 kg. In this state, the liquid phase in the filling container disappeared, the entire amount of the hydrogen sulfide mixture was gasified, and the moisture concentration of the gas was 60 mol ppm.

A rectangular-shaped (10 mm in width, 50 mm in length, and 1 mm in thickness) SUS316L test piece was prepared, the mass was measured, and then the test piece was hung in a pressure resistant container using a string containing Teflon (Registered Trademark). The hydrogen sulfide mixture gas having a moisture concentration of 60 mol ppm was introduced into the pressure resistant container, and then the internal pressure was set to 0.5 MPaG.

The pressure resistant container was allowed to stand for 5 days in a state of being heated at 100° C., and then sufficiently purged with $N_2$. Then, after confirming that the hydrogen sulfide concentration was less than 0.1 mol ppm, the pressure resistant container was opened, and then the test piece was taken out. The taken-out test piece was ultrasonically cleaned with ultrapure water and a 10% by mass nitric acid aqueous solution for 10 minutes, respectively, and then dried. Thereafter, the mass was measured, and then the corrosion rate was calculated from mass changes. As a result, the corrosion rate was 0.83 μm/y. Thus, the progress of the corrosion by the remaining gas was very slow even in a state where 97% of the initial filling amount was discharged.

Example 2

A hydrogen sulfide mixture gas having a moisture concentration of 30 mol ppm was obtained by performing the same operation as that of Example 1, except that the moisture concentration of the liquid phase in the completion of the filling into the filling container was 6.0 mol ppm. The corrosion rate of a test piece was 0.64 μm/y as measured by performing the same operation as that of Example 1, except using the hydrogen sulfide mixture gas.

Example 3

A hydrogen sulfide mixture gas having a moisture concentration of 3.8 mol ppm was obtained by performing the same operation as that of Example 1, except that the moisture concentration of the liquid phase in the completion of the filling into the filling container was 0.75 mol ppm. The corrosion rate of a test piece was 0.41 μm/y as measured by performing the same operation as that of Example 1, except using the hydrogen sulfide mixture gas.

Example 4

A hydrogen sulfide mixture gas having a moisture concentration of 0.75 mol ppm was obtained by performing the same operation as that of Example 1, except that the moisture concentration of the liquid phase in the completion of the filling into the filling container was 0.15 mol ppm. The corrosion rate of a test piece was 0.38 μm/y as measured by performing the same operation as that of Example 1, except using the hydrogen sulfide mixture gas.

Comparative Example 1

A hydrogen sulfide mixture gas having a moisture concentration of 75 mol ppm was obtained by performing the same operation as that of Example 1, except that the moisture concentration of the liquid phase in the completion of the filling into the filling container was 15 mol ppm. The corrosion rate of a test piece was 7.1 μm/y as measured by performing the same operation as that of Example 1, except using the hydrogen sulfide mixture gas.

Comparative Example 2

A hydrogen sulfide mixture gas having a moisture concentration of 150 mol ppm was obtained by performing the same operation as that of Example 1, except that the moisture concentration of the liquid phase in the completion of the filling into the filling container was 30 mol ppm. The corrosion rate of a test piece was 47 μm/y as measured by performing the same operation as that of Example 1, except using the hydrogen sulfide mixture gas.

These results (see Table 1) indicate that, when the moisture concentration of the liquid phase in the completion of the filling into the filling container is less than 15 mol ppm, the moisture concentration of the hydrogen sulfide mixture gas emitted from the filling container is sufficiently low to the end of the emission (time when the entire amount of the liquefied hydrogen sulfide mixture in the filling container is gasified), and therefore the corrosion of metals is remarkably controlled.

TABLE 1

|  | Ex. 1 | Ex. 2 | Ex. 3 | Ex. 4 | Comp. Ex. 1 | Comp. Ex. 2 |
|---|---|---|---|---|---|---|
| Moisture concentration of liquid phase in completion of filling (mol ppm) | 12 | 6.0 | 0.75 | 0.15 | 15 | 30 |
| Moisture concentration of gaseous phase after extracting gaseous phase until remaining amount is 1 kg (mol ppm) | 60 | 30 | 3.8 | 0.75 | 75 | 150 |
| Corrosion rate (μm/y) | 0.83 | 0.64 | 0.41 | 0.38 | 7.1 | 47 |

Example 5

Next, an example of a method for producing a hydrogen sulfide mixture having a moisture concentration of less than 15 mol ppm is described. A crude hydrogen sulfide mixture gas having a moisture concentration of 1000 mol ppm was sent to a moisture adsorption column at a flow of 320 m³/h to be brought into contact with a moisture adsorbent (Molecular Sieve 3A manufactured by UNION SHOWA K.K.) filled into the moisture adsorption column to be dehydrated. With respect to the circulation velocity of the crude hydrogen sulfide mixture gas, the linear velocity LV is 10 m/min and the space velocity SV is 1000/h. The moisture concentration of the hydrogen sulfide mixture gas at an outlet of the moisture adsorption column was 5.1 mol ppm.

30 kg of the hydrogen sulfide mixture gas having a moisture concentration of 5.1 mol ppm was filled into a filling container having a capacity of 47 L while increasing the pressure with a pump. The moisture concentration of a liquefied hydrogen sulfide mixture (liquid phase) in the filling container was 6.2 mol ppm.

The invention claimed is:

1. A hydrogen sulfide mixture contained in a filling container, the hydrogen sulfide mixture consisting of:
   hydrogen sulfide; and
   water,
   wherein at least one part of the hydrogen sulfide mixture is present as a liquid phase and a water concentration of the liquid phase is 0.01 mol ppm or more and less than 0.75 mol ppm.

2. A method for producing the hydrogen sulfide mixture contained in a filling container according to claim 1, the hydrogen sulfide mixture consisting of hydrogen sulfide and water, the method comprising:
   a dehydration step of bringing a hydrogen sulfide mixture having a water concentration of 15 mol ppm or more into contact with a moisture adsorbent to reduce the water concentration to less than 10 mol ppm; and
   a filling step of filling the hydrogen sulfide mixture obtained in the dehydration step into a filling container so that at least one part of the hydrogen sulfide mixture is liquid and the water concentration of a liquid phase in completion of the filling is 0.01 mol ppm or more and less than 15 mol ppm.

3. The method for producing the hydrogen sulfide mixture according to claim 2,
   wherein at least one part of the filling container is formed of stainless steel.

4. The method for producing a hydrogen sulfide mixture according to claim 3,
   wherein a ratio $V/G_i$ of an internal volume V (unit: L) of the filling container to a filling amount $G_1$ (unit: kg) of the hydrogen sulfide mixture into the filling container in the filling step is 1.47 or more and 37.0 or less.

5. The method for producing the hydrogen sulfide mixture according to claim 2,
   wherein a ratio $V/G_1$ of an internal volume V (unit: L) of the filling container to a filling amount $G_1$ (unit: kg) of the hydrogen sulfide mixture into the filling container in the filling step is 1.47 or more and 37.0 or less.

* * * * *